(12) United States Patent
De Soccio

(10) Patent No.: US 8,544,617 B2
(45) Date of Patent: Oct. 1, 2013

(54) RAILROAD AND INDUSTRIAL VEHICLE DISK BRAKE PAD

(75) Inventor: Vittorio De Soccio, Benevento (IT)

(73) Assignee: Cofren S.r.l., Avellino (IT)

( * ) Notice: Subject to any disclaimer, the term of this patent is extended or adjusted under 35 U.S.C. 154(b) by 282 days.

(21) Appl. No.: 12/939,307

(22) Filed: Nov. 4, 2010

(65) Prior Publication Data
US 2011/0114426 A1    May 19, 2011

(30) Foreign Application Priority Data

Nov. 5, 2009 (IT) .............................. RM2009A0570

(51) Int. Cl.
*F16D 65/092* (2006.01)

(52) U.S. Cl.
USPC ................... 188/235; 188/250 B; 188/250 E; 188/73.37

(58) Field of Classification Search
USPC .......... 188/235, 250 E, 250 G, 250 B, 250 R, 188/247, 240, 234, 73.31, 73.37, 73.1, 73.2, 188/71.31
See application file for complete search history.

(56) References Cited

U.S. PATENT DOCUMENTS

| 3,897,859 | A | * | 8/1975 | Norcia ....................... 192/107 C |
| 4,600,090 | A | | 7/1986 | Feldmann |
| 4,941,558 | A | * | 7/1990 | Schraut ...................... 192/107 C |
| 5,135,094 | A | | 8/1992 | De Briel |
| 2006/0151267 | A1 | * | 7/2006 | Russo et al. .............. 188/250 B |

FOREIGN PATENT DOCUMENTS

| EP | 1 099 061 B1 | | 11/2002 |
| EP | 1318321 A1 | * | 6/2003 |
| GB | 2186334 A | * | 8/1987 |
| GB | 2 442 103 A | | 3/2008 |
| JP | 56167935 A | * | 12/1981 |
| JP | 01046025 A | * | 2/1989 |
| JP | 2006275230 A | * | 10/2006 |

OTHER PUBLICATIONS

Search Report, dated Sep. 7, 2010, from the Italian Ministry of Economic Development (Ministero dello Sviluppo Economico), issued in counterpart Italian Application No. RM20090570.

* cited by examiner

*Primary Examiner* — Anna Momper
(74) *Attorney, Agent, or Firm* — Venable LLP; Robert Kinberg; Tamatane J. Aga

(57) ABSTRACT

A railroad and industrial vehicle disk brake pad having a supporting plate and a number of friction members. Each friction member is elongated in shape, with two curved parallel long sides, and is fixed to the supporting plate so that the curves of the long sides form a substantially 0° angle with respective concentric circles of a disk to which the pad fitted. To prevent displacement of the friction members, these are fixed to the supporting plate with the interposition of antirotation means.

4 Claims, 5 Drawing Sheets

RAILROAD AND INDUSTRIAL VEHICLE DISK BRAKE PAD

CROSS-REFERENCE TO RELATED APPLICATION

This application claims the priority of Italian Patent Application No: RM2009A 000570, filed on Nov. 5, 2009, the subject matter of which is incorporated herein by reference in its entirety.

BACKGROUND OF THE INVENTION

As is known, disk brakes undergo severe stress, and optimum braking action depends on effective transmission of the braking force from the pad to the disk.

Research over the past few years has shown more is to be gained from a number of friction bodies on one pad than from one large friction body.

European Patent EP 1099061 describes a disk brake pad, in particular for railroad vehicles, comprising a number of friction members fixed to a supporting plate. Each friction member is elongated in shape, is fixed to the supporting plate by two rivets, and is positioned differently from the others with respect to concentric circles of the disk, while still maintaining an angle α of $0° < α ≤ 45°$ with respect to the concentric circles of the disk.

The Applicant has surprisingly discovered that curved elongated friction members, all located along concentric circles of the disk, provide for improving performance in terms of both braking efficiency and noise.

SUMMARY OF THE INVENTION

It is an object of the present invention to provide a railroad and industrial vehicle disk brake pad with the main characteristics as claimed in the attached claims.

BRIEF DESCRIPTION OF THE DRAWINGS

Two non-limiting embodiments of the present invention will be described by way of example with reference to the accompanying drawings, in which.

DETAILED DESCRIPTION OF THE INVENTION

Figure 1:
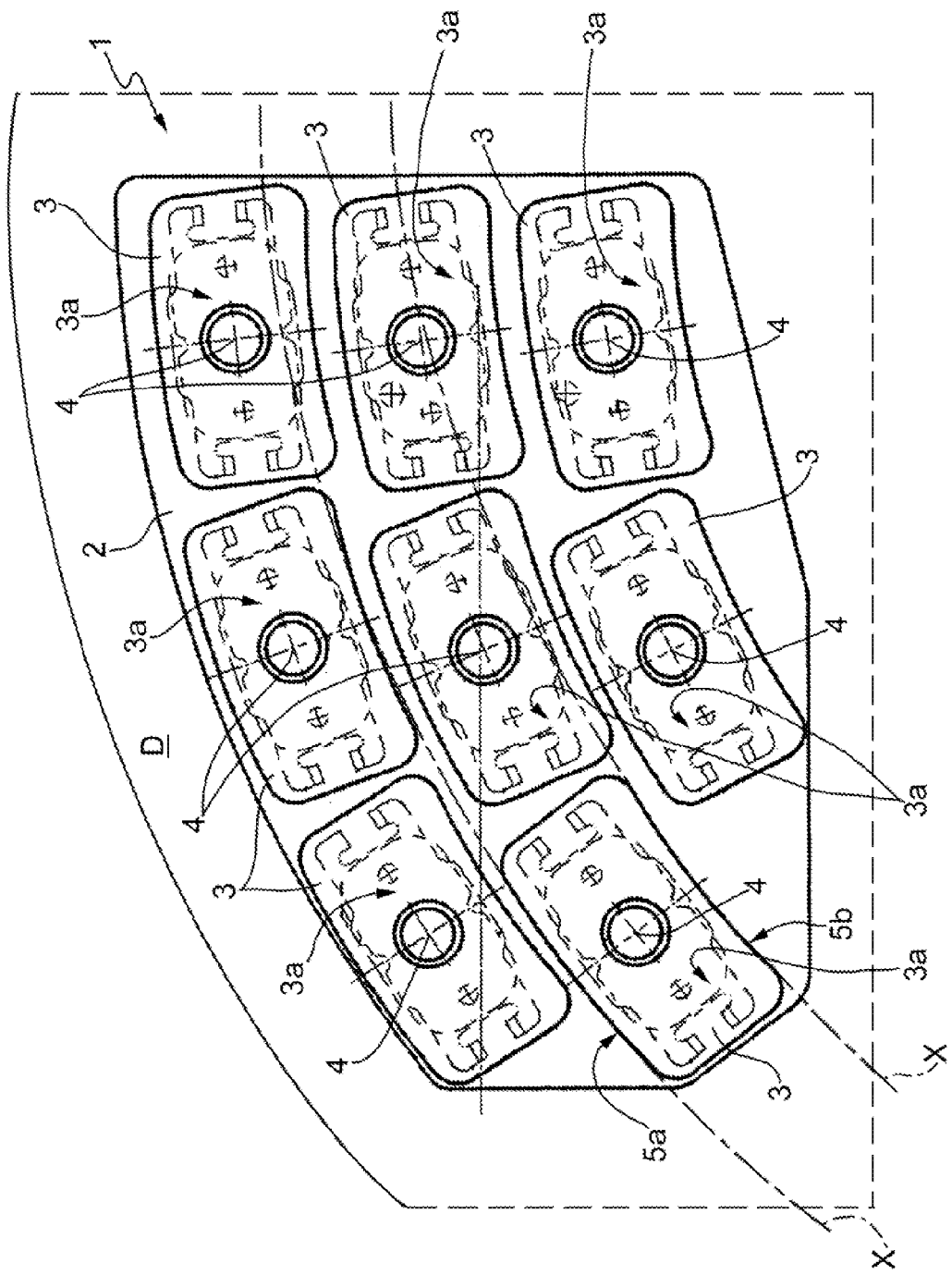
FIG. 1 shows a partly transparent plan view of a first embodiment of the pad according to the present invention.

Number 1 in FIG. 1 indicates as a whole a first embodiment of the pad according to the present invention.

Pad 1 substantially comprises a supporting plate 2; and eight friction members 3, each fixed to supporting plate 2 by one rivet 4.

Each friction member 3 is elongated in shape, and defined by two parallel curved long sides 5a and 5b.

Friction members 3 are fixed to supporting plate 2 so that the curves of sides 5a and 5b form an angle of 0° with respective concentric circles X of the disk D on which pad 1 acts.

Each friction member 3 thus has an elongated friction surface 3a defined by two curved long sides located in use along concentric circles X of disk D.

Given that railroad and industrial vehicle disk brake pads have only one position with respect to the disk, it is the Applicant's opinion that the position of the friction members in the pad is definable, for patent purposes, by defining their position with respect to the disk.

More specifically, friction members 3 are substantially rectangular, with two curved parallel long sides.

Each friction member 3 is fitted with a strengthener 6 (FIG. 3) incorporated in friction member 3, leaving a fastening surface of the strengthener exposed, i.e. the fastening surface of strengthener 6 is positioned flush with the surface of friction member 3 facing the supporting plate.

Figure 3:
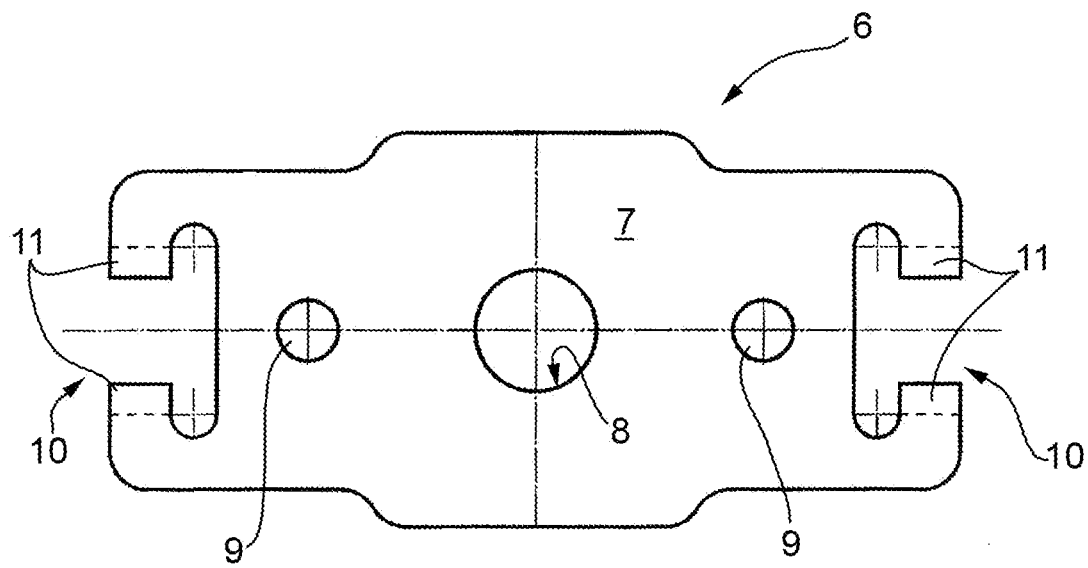
FIG. 3 shows a plan view of a detail common to both the FIGS. 1 and 2 embodiments.

As shown in FIG. 3, each strengthener 6 comprises a plate 7, in which are formed a central hole 8 for rivet 4, and two circular teeth 9 extending perpendicularly on opposite sides of central hole 8 and which, as described below, aid in preventing rotation of friction member 3. Each strengthener 6 also comprises two fastening portions 10 located at the two ends of plate 7, and each having two fastening teeth 11 extending inside friction member 3, perpendicularly to plate 7 and on the opposite side to teeth 9.

Pad 1 comprises a number of antirotation members 12 (one shown in FIG. 4), each of which has a first face fitted to supporting plate 2, and a second face fitted to a respective strengthener 6.

Figure 4:
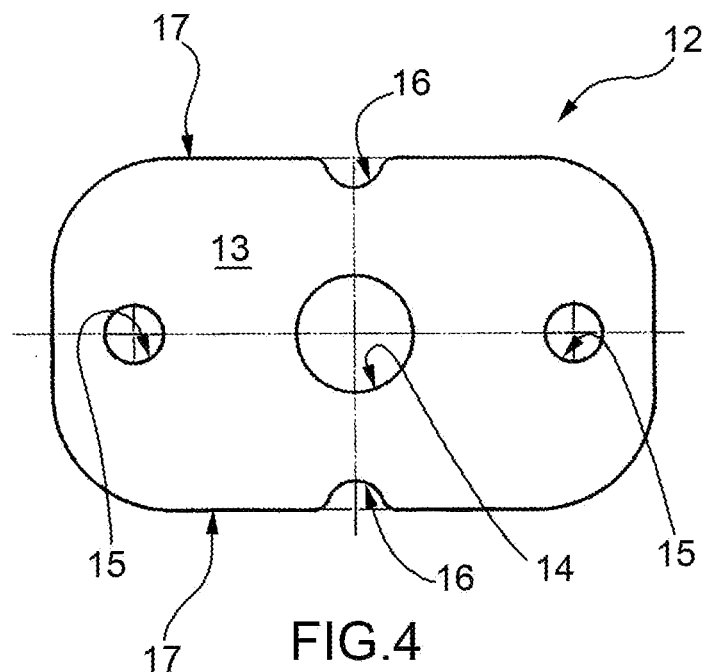
FIG. 4 shows a plan view of another detail common to both the FIGS. 1 and 2 embodiments.

As shown in FIG. 4, each antirotation member 12 comprises a plate 13, in which are formed a central hole 14 for rivet 4, and two holes 15 for housing teeth 9 of strengthener 6.

Each antirotation member 12 has two recesses 16, each formed along a respective side 17 of plate 13, and each housing a respective rotation-lock pin (not shown for the sake of simplicity) extending from supporting plate 2.

As will be clear from the above description, the arrangement of the friction members is an essential characteristic of the present invention and must therefore be maintained during operation of the brake. Hence the need for antirotation members, which are even more necessary in view of the fact that each friction member is only fixed to the supporting plate by one rivet, about which it can therefore rotate.

The fact that strengthener 6 is integral with, i.e. incorporated in, friction member 3 and locked by teeth 9 cooperating with holes 15 in antirotation member 12, in turn locked to supporting plate 2 by recesses 16, ensures friction members 3 are held in position on the pad during operation.

Antirotation members 12 also serve as spacers to allow air to circulate between friction members 3 and supporting plate 2.

Despite this further advantage of antirotation members 12, the wider protective scope of the pad according to the present invention also covers different antirotation means, provided they are equally capable of maintaining the position of the friction members during operation.

Figure 2:
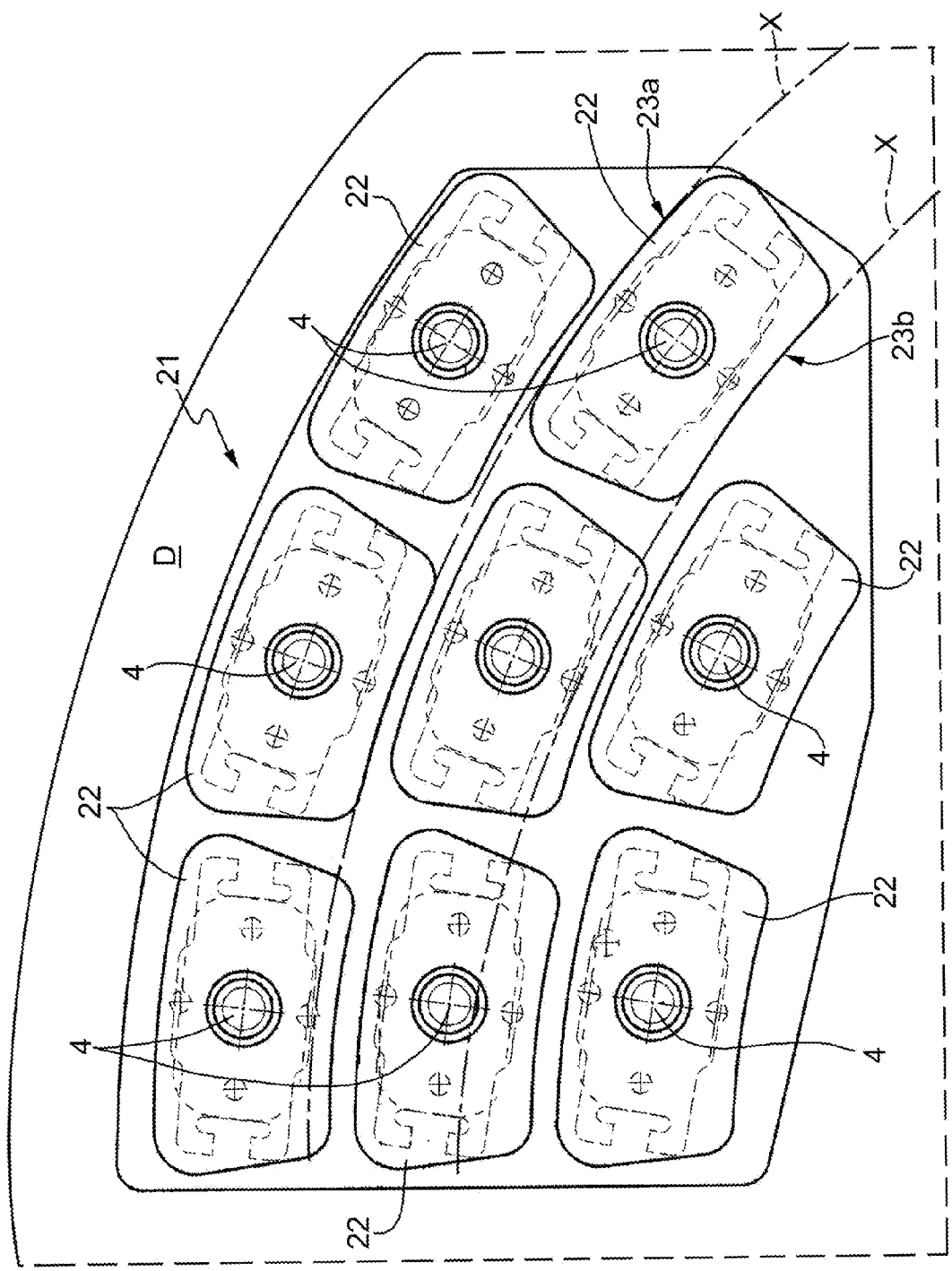
FIG. 2 shows a partly transparent plan view of a second embodiment of the pad according to the present invention.

Number 21 in FIG. 2 indicates as a whole a second embodiment of the disk brake pad according to the present invention.

Identical parts of pads 21 and 1 are indicated using the same reference numbers, with no further description.

Pad 21 substantially differs from pad 1 as to the shape of the friction members. Pad 21 comprises eight substantially trapezoidal friction members 22, the major and minor base sides of which are curved to achieve the required angle with respect to the concentric circles X of disk D.

In this case, too, friction members 22 are elongated in shape and defined by two parallel curved long sides 23a, 23b, but, unlike friction members 3, have two long sides of different lengths, despite both defining the elongated shape.

Friction members 22 have a possible further advantage over friction members 3, by having a longer side, and so providing greater friction, where circumferential speed is greater.

Figure 5:
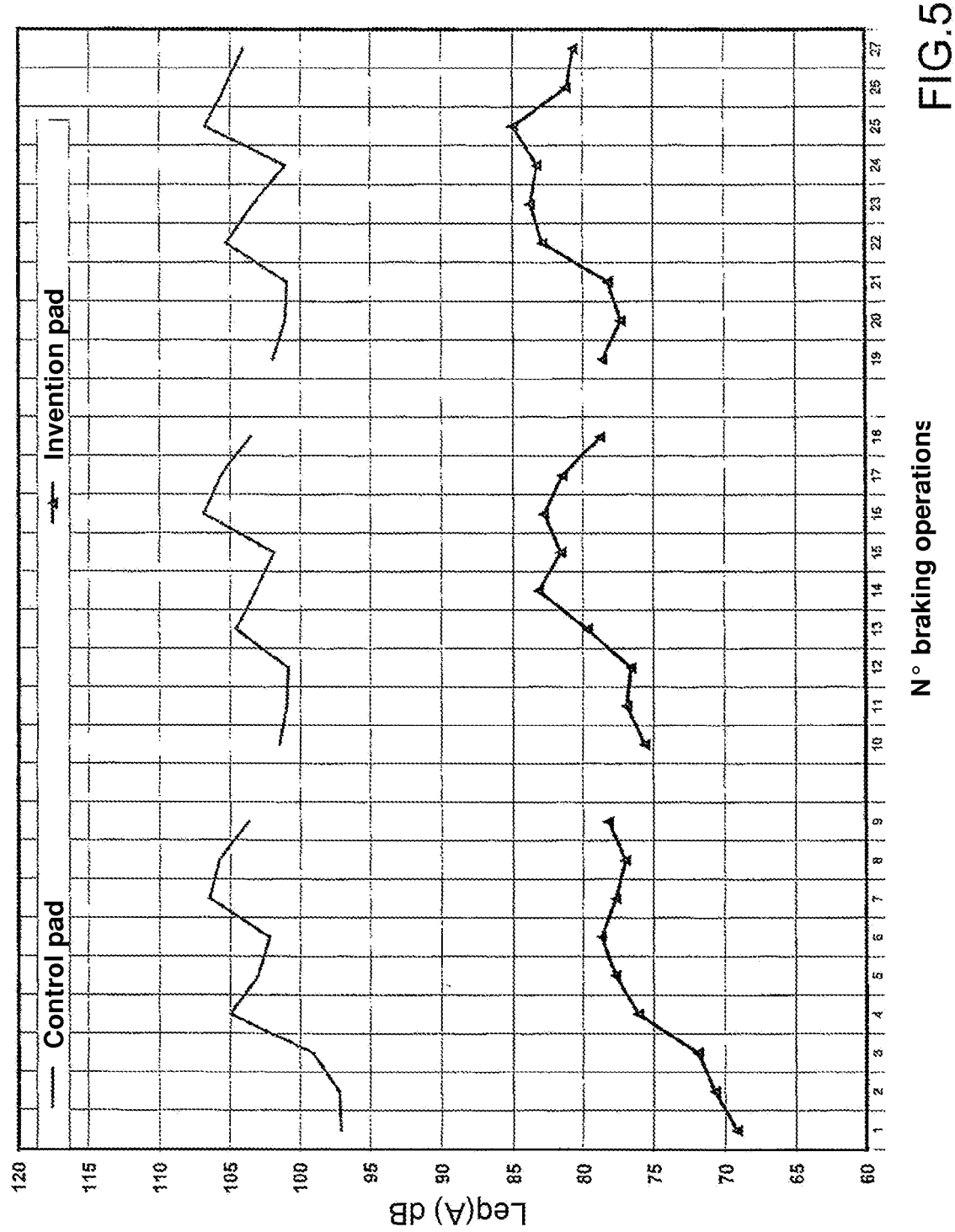
FIG. 5 shows a graph of noise test results of a cast iron disk brake.
Figure 6:
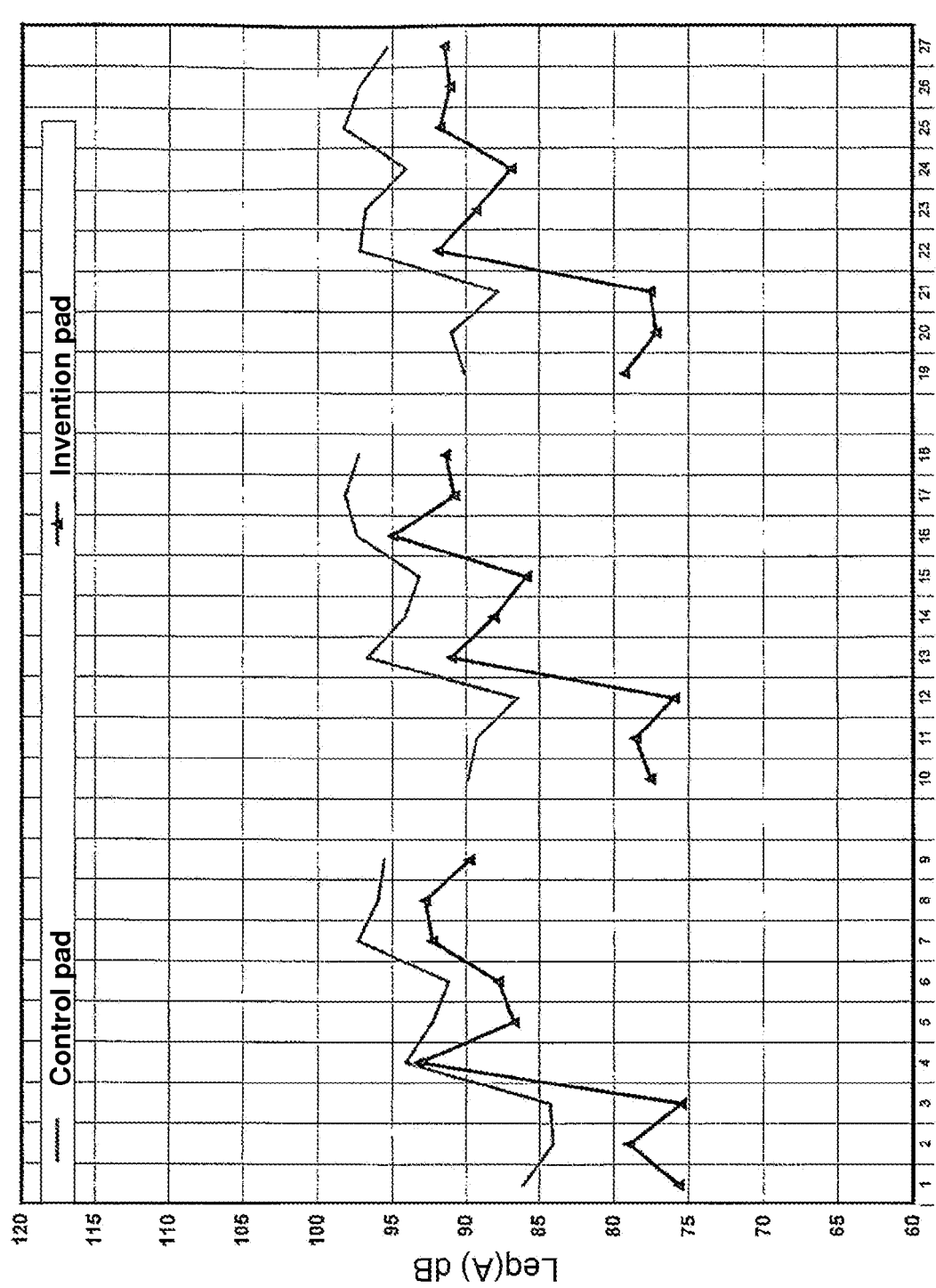
FIG. 6 shows a graph of noise test results of a steel disk brake.

FIGS. 5 and 6 show the noise test results of a 640×110 mm cast iron disk and steel disk respectively.

Noise testing was conducted under the same conditions using pad 1 as described above, and a typical known control pad. More specifically, the control pad comprised triangular friction members positioned differently with respect to the concentric circles of the disk and made of the same material as the friction members of pad 1.

Noise was recorded over three sets of braking operations (from 1 to 9, from 10 to 18, and from 19 to 27) at different pressures. Each set comprised three braking operations at a disk speed of 50 km/h, three at a disk speed of 70 km/h, and three at a disk speed of 100 km/h. These speeds were chosen to simulate train speed nearing or entering a station, i.e. where noise level is most important.

As shown by the results in decibels in the FIGS. 5 and 6 graphs, the pads according to the present invention have a much lower noise level than the control pads, with no impairment in braking efficiency.

The invention claimed is:

1. A railroad and industrial vehicle disk brake pad comprising a supporting plate and a number of friction members each fixed to said supporting plate by one rivet; each friction member being elongated in shape, with two curved parallel long sides and being fixed to said supporting plate so that the curves of the long sides form a substantially 0° angle with respective concentric circles of a disk to which the pad is fitted; each of said friction members being fixed to said supporting plate with the interposition of antirotation means comprising a strengthener incorporated in said friction member and an antirotation member which, on one side, is fixed to said supporting plate, and, on the other side, cooperates in antirotation manner with the strengthener; each strengthener comprising a plate including a central hole for the rivet, two lock teeth and two fastening portions located at two ends of the plate; each fastening portion having two teeth extending inside the friction member, perpendicularly to the plate and on the opposite side to the lock teeth; each antirotation member comprising a plate including a central hole for the rivet, and two holes for housing the lock teeth.

2. A disk brake pad as claimed in claim 1, characterized in that each antirotation member comprises two recesses formed along respective sides of the plate and for housing respective rotation-lock members extending from the supporting plate.

3. A disk brake pad as claimed in claim 1, characterized in that said friction members are substantially rectangular.

4. A disk brake pad as claimed in claim 1, characterized in that said friction members are substantially trapezoidal.

\* \* \* \* \*